United States Patent [19]

Bennett

[11] Patent Number: 4,674,840

[45] Date of Patent: Jun. 23, 1987

[54] LIQUID CRYSTAL DISPLAY WITH POLARIZER AND BIAXIAL BIREFRINGENT SUPPORT

[75] Inventor: Stewart Bennett, Concord, Mass.

[73] Assignee: Polaroid Corporation, Patent Dept., Cambridge, Mass.

[21] Appl. No.: 564,753

[22] Filed: Dec. 22, 1983

[51] Int. Cl.[4] .............................................. G02F 1/133
[52] U.S. Cl. .................................. 350/337; 350/339 R
[58] Field of Search ................... 350/337, 339 R, 338, 350/336, 398, 397

[56] References Cited

U.S. PATENT DOCUMENTS

| | | | |
|---|---|---|---|
| 2,445,555 | 7/1948 | Binda | 88/65 |
| 3,736,047 | 3/1973 | Gelber et al. | 350/338 |
| 3,785,721 | 6/1974 | Harsch | 350/347 E |
| 3,835,463 | 9/1974 | Tsukamoto | 350/333 X |
| 3,963,324 | 6/1976 | Fergason | 350/341 |
| 3,970,362 | 7/1976 | Laliberte | 350/397 |
| 4,012,119 | 3/1977 | Adams et al. | 350/338 |
| 4,139,278 | 2/1979 | Matsumoto et al. | 350/336 X |
| 4,166,871 | 9/1979 | Schuler | 350/398 X |
| 4,181,756 | 1/1980 | Fergason | 350/337 X |
| 4,217,160 | 8/1980 | Perregaux | 350/337 X |
| 4,241,984 | 12/1980 | Leibowitz | 350/337 |
| 4,387,133 | 6/1983 | Ichikawa et al. | 350/337 X |
| 4,388,375 | 6/1983 | Hopper et al. | 350/337 X |
| 4,505,546 | 3/1985 | Umeda et al. | 350/334 |
| 4,533,214 | 8/1985 | Penz et al. | 350/337 |
| 4,586,790 | 5/1986 | Umeda et al. | 350/337 |

FOREIGN PATENT DOCUMENTS

| | | |
|---|---|---|
| 0025457 | 3/1981 | European Pat. Off. . |
| 0089493 | 9/1983 | European Pat. Off. . |
| 2313730 | 3/1974 | Fed. Rep. of Germany . |
| 2422784 | 11/1974 | Fed. Rep. of Germany . |
| 3127347 | 7/1982 | Fed. Rep. of Germany . |
| 3137518 | 4/1983 | Fed. Rep. of Germany . |
| 0065926 | 5/1980 | Japan ................................... 350/337 |
| 0149909 | 11/1980 | Japan ............................. 350/339 R |
| 0143319 | 8/1983 | Japan ................................... 350/337 |
| 2119110 | 11/1983 | United Kingdom . |

OTHER PUBLICATIONS

Patent Abstracts of Japan, vol. 7, No. 192.

Primary Examiner—John K. Corbin
Assistant Examiner—David Lewis
Attorney, Agent, or Firm—Louis G. Xiarhos

[57] ABSTRACT

An improved liquid crystal display includes, in sequence from the viewing surface to the medial plane of the display, a substantially transparent polymeric layer, a polarizing layer, a protective layer, a transparent electrode layer, an alignment layer, and a layer of liquid crystal material. The use of a polymeric layer with a polarizing layer intermediate the polymeric layer and the liquid crystal material results in a relatively lower cost display in which the optical anisotropy of the polymeric material does not adversely affect the operation of the liquid crystal display.

47 Claims, 2 Drawing Figures

LIQUID CRYSTAL DISPLAY WITH POLARIZER AND BIAXIAL BIREFRINGENT SUPPORT

BACKGROUND OF THE INVENTION

The present invention relates to electro-optical devices and more particularly to improved liquid crystal displays.

Conventional liquid crystal displays utilize two spaced plane-parallel glass plates with conductive electrode patterns and a layer of liquid crystal material confined therebetween. Traditionally, polarizers are placed externally to the glass plates. Light entering one side of the display is polarized along one axis, altered as it passes through and as a function of the liquid crystal material, and exits through the other polarizer, typically in an orthogonal relation to the first polarizer. Application of a voltage potential across selected electrodes alters the orientation of the liquid crystal molecules therebetween to locally alter the optical characteristics of the cell and to achieve the desired optical display effect. More sophisticated displays may incorporate a reflector or a transreflector to provide a display that can operate in either a light reflecting or light transmitting mode.

In the manufacture of liquid crystal display devices, the polarizers are typically located externally to the glass plates so that each glass plate is positioned between a polarizer and the liquid crystal layer. Since the glass is optically isotropic, the glass does not adversely affect the polarized light dynamics. Glass plates are well suited for liquid crystal display applications since they are optically transparent and isotropic, rigid, dimensionally stable and impervious to gases. The use of glass plates, however, poses a number of drawbacks with regard to cost and ease of manufacturing since glass is comparatively fragile and not well suited to high-speed automatic fabrication techniques.

It has been suggested, for example, in U.S. Pat. No. 4,228,574 to Culley et al. to replace the glass plates with plastic. However, the substitution of plastic materials for the glass can lead to problems that affect cell performance. For example, polyester plates, while transparent and chemically compatible with liquid crystal materials, are typically biaxially oriented and birefringent. These birefringent plates, owing to their light-depolarizing properties and positioning intermediate the externally placed polarizers, serve to adversely affect cell performance.

Stretching polyester to provide a uniaxially oriented material to solve the problems associated with biaxial polyester gives rise to other problems. For example, it is preferred from the standpoint of dimensional stability, particularly as affected by temperature variations, to utilize each of the uniaxial support sheet materials in parallel orientation. In addition, it is preferred to utilize each of a pair of orthogonal polarizers of a liquid crystal display device at an angle of 45° with respect to the vertical and horizontal dimensions of the display. The requirement that each of the uniaxially oriented polyester plates be aligned in parallel relation to its adjacent polarizer, or perpendicularly with respect to such polarizer, dictates that the polyester plates be cut diagonally from an uniaxially stretched polyester web and that they be properly aligned with the externally placed polarizers. This process complicates the manufacturing process and generates considerable scrap material. In addition, the uniaxially oriented polyester material may exhibit an undesired amount of birefringence.

Other materials that are optically transparent and optically isotropic, such as cellulose acetate butyrate, may require modification with plasticizers in order to obtain essential physical properties. These modifications result in materials that are chemically incompatible with known liquid crystal materials and mixtures.

It has also been suggested in U.S. Pat. No. 4,241,984 to Leibowitz, to place the polarizers internally of the transparent glass plates, over the conductive electrodes and in contact with the liquid crystal material, so that the surface characteristics of orthogonally oriented polarizers also effect the desired twisted alignment of the nematic liquid crystal material. Polarizing materials, however, may be chemically incompatible with the liquid crystal materials and the thickness of the polarizer necessary for reasonable optical efficiency would be inconsistent with the need to achieve the necessary voltage gradient across the liquid crystal material at moderate supply voltage.

SUMMARY OF THE INVENTION

In view of the above and in accordance with the present invention, an improved liquid crystal display includes polarizing layers that are located between polymeric support materials and the electrical and optically active layers of the cell. Since the polymeric materials are external to the polarizing layers of the cell, the birefringent character thereof does not adversely affect the optical characteristics of the cell. The polarizing layers do not affect the magnitude of the required switching voltage-gradient, since the polarizing layers are outside the electrode structure. The polarizing layers can be chemically isolated from the cell by alignment layers, and, preferably, by additional protective barrier layers between the polarizing and the electrode layers.

A principal objective of the present invention is, therefore, the provision of an improved liquid crystal display that can be manufactured at a relatively lower cost than prior liquid crystal display constructions and which is well suited for high-speed, automatic manufacturing. Other objects and further scope of applicability of the present invention will become apparent from the detailed description to follow, taken in conjunction with the accompanying drawings in which like parts are designated by like reference numerals.

DESCRIPTION OF THE PREFERRED EMBODIMENT

Figure 1:
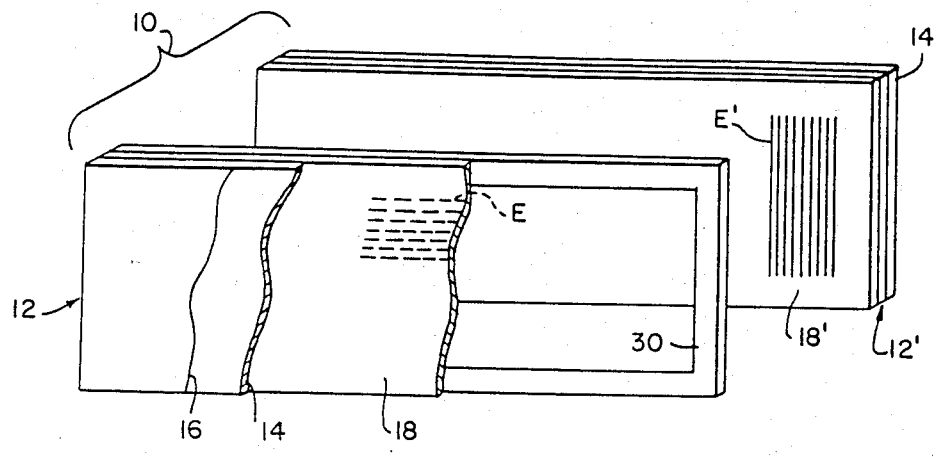
FIG. 1 is an exploded isometric view of a liquid crystal display in accordance with the present invention.

A liquid crystal display in accordance with the present invention is illustrated in exploded isometric view in FIG. 1 and generally referred to therein by the reference character 10. The liquid crystal display 10 includes front and rear laminate assemblies 12 and 12' which, when assembled together with a liquid crystal layer, form the completed liquid crystal display. The front and rear assemblies 12 and 12' may be constructed in identical fashion or one or both may be modified depending upon the type of display desired to include a reflector or transreflector layer, as described more fully below.

The laminate assemblies 12 and 12' each include transparent substrates 14 and 14' which provide primary mechanical support for the completed liquid crystal display. The substrates 14 and 14' are preferably fabricated from a transparent or translucent polyester such as polyethylene terephthalate. Substrate materials 14 and 14' will desirably be flexible sheet materials so as to facilitate handling and manufacture of the liquid crystal display devices hereof according to a continuous method. Polymeric film materials suited to use herein include cellulose esters such as nitrocellulose, cellulose acetate or cellulose acetate butyrate, polyesters, polycarbonates, vinyl polymers such as acrylics, or other polymers that can be provided in a sheet-like light-transmissive form.

The polyesters are especially useful from the standpoints of low cost and ready availability and ease of handling in manufacture. Typically such polyester materials will be biaxially oriented and will exhibit birefringence. As pointed out previously, the birefringent character of such support materials is not a detriment to the operation of the devices hereof inasmuch as the biaxially oriented and birefringent support materials will be positioned in such devices outwardly of the light-polarizing and other electro-optical elements of the devices hereof. A preferred polyester is polyethylene terephthalate available under the Mylar and Estar tradenames, although other polyethylene terephthalate materials can be employed.

The thickness of the substrates 14 and 14' should be sufficient to impart the desired structural strength to the final liquid crystal display 10. In accordance with one preferred embodiment of the present invention, the substrates 14 and 14' are 7 mils. thick (about 0.178 mm.).

If desired, the support substrates 14 and 14' may be provided with exterior overcoats or layers 16 and 16' that function as antireflection coatings or antiabrasion coatings. A preferred material for use as an exterior protective coating for polyethylene terephthalate is a low index of refraction fluorinated polymer, preferably coated at a quarter wave optical thickness for visible light. Fluorinated polymers and methods for their application to polyester substrate materials are described in detail in U.S. Pat. No. 4,066,814 to Chiklis and can be suitably employed herein.

Polarizing layers 18 and 18' are laminated to the support substrates 14 and 14', respectively, by means of an intermediate transparent adhesive, generally indicated at 20 and 20', respectively. Polarizing layers 18 and 18', which may be of the same or different polarizing material, are comprised of linear dichroic light-polarizing material. It will be preferred that each of polarizing layers 18 and 18' comprise a single layer of light-polarizing material so as to minimize the thickness of the liquid crystal display devices. In general, the polarizing layers will have a thickness in the range of about 0.1 to 3 mils (about 0.0025 to 0.076 mm.).

A preferred material to serve as polarizing layer 18 and 18' is a unitary layer of stretched (oriented) polyvinyl alcohol of about one-mil thickness (0.025 mm.) stained according to known methods with a dichroic dye such as iodine. Such a polarizing material will also be preferably borated for improved stability. Suitable polarizing layers of this type can be prepared utilizing methods set forth in U.S. Reissue Pat. No. Re. 23,297 and in U.S. Pat. No. 4,166,871. Another preferred polarizing material is a stretched polyvinyl alcohol sheet containing polyvinylene light-polarizing species such as may be provided by hydrochloric acid vapor processing in known manner. Preferably, such polarizing material will be borated for improved stability. Suitable methods for the production of such polarizing materials are described in U.S. Pat. No. 2,445,555. The polarizing layers hereof can be readily bonded to transparent substrate materials 14 and 14' which provide primary mechanical support for the completed liquid crystal displays. The axis of polarization of the polarizing layer 18 and 18' can be aligned orthogonally relative to each other or in parallel relation, for example, orthogonally at an angle of 45° and 135°, respectively, from the vertical in FIG. 1.

The transparent adhesive used to affix the polarizing layers 18 and 18' to the respective substrates 14 and 14' should be selected for environmental stability and for adherencey to both the substrate material and the polarizing layers 18 and 18'. For this latter purpose, the adhesive should be hydrophilic if the polarizing material is essentially of a polyvinyl or other hydrophilic alcohol constituency. Suitable adhesives include polyvinyl alcohol and urethane-based adhesive materials. The thickness of the transparent adhesive layers 20 and 20' is selected to be sufficiently thick to achieve the intended purpose without adversely affecting the optical transmission properties of the completed liquid crystal display. In general, an adhesive layer, having a thickness of up to about 1.0 mil. (about 0.025 mm.) is satisfactory.

Transparent conductive layers 22 and 22' are applied over the polarizing layers 18 and 18'. The transparent conductive layers 22 and 22' may be of any conventional metal or metal oxide material including silver, gold, indium oxide, indium-tin oxide, or the like applied by any conventional method including vapor deposition, magnetron sputtering, or by bombardment from a plasma generator or the like. In addition, the transparent conductive layers 22 and 22' may be subjected to a photo-resist etching process to form multi-segment numeric or alphanumeric display patterns or, as shown in FIG. 1, closely spaced parallel electrode lines E and E' which are crossed relative to one another. An addressable picture element (pixel) is defined at the intersection of each of the electrode line E and E'.

If desired, transparent conductive layers 22 and 22' can comprise multiple layers. Thus, conductive electrodes having improved transmission properties can be provided from a suitable conductive metal, such as silver, sandwiched between layers of a high index of refraction dielectric material such as indium oxide, titanium dioxide or the like. A preferred conductive electrode material 18 and/or 18' comprises a titania/silver/titania arrangement of layers which can be suitably deposited by vacuum deposition technique over polarizing layers 18 and 18' carried on support material 14 and 14'. Preferably, the silver layer will contain a minor amount of gold, platinum or like metal to provide environmental stability. A web of polyester containing a polarizing layer can be passed in a series of passes over vapors of titania, silver, and titania, respectively, so as to deposit the desired layers. A slotted mask can be used, if desired, to effect a selective deposition of the vapors in the form of spaced electrode lines which define pixels at the intersection thereof. Alternatively, a continuous coating of electrode material can be subjected to an etching process to selectively remove conductive material to achieve a predetermined electrode pattern.

Figure 2:
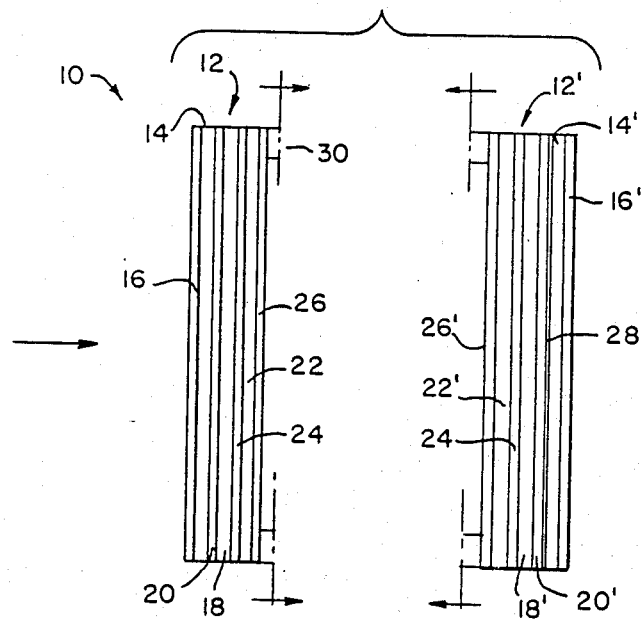
FIG. 2 is a side elevational view, in cross section of the liquid crystal display of FIG. 1.

As shown in FIG. 2, protective layers 24 and 24' can be applied to the confronting surfaces of the polarizing layers 18 and 18', respectively, before the transparent conductive layers 22 and 22' are applied. These protective layers while not essential are preferred and serve important barrier functions in protecting the conductive electrodes from possible corrosive or degradative influences of the polarizing layers 18 and 18' and in preventing the contamination of the liquid crystal material by components of such polarizing layers. In addition, protective or barrier layers 24 and 24' serve to protect polarizing layers 18 and 18' against the effect of the optically active liquid crystal material which may not be chemically compatible therewith. The protective layers 24 and 24' can also assist in protecting the polarizing layers 18 and 18' where, for example, selected areas of the transparent conductive layers 22 and 22' are removed by chemical treatment in a photo-resist etching process. For example, where the polarizing material is essentially of a polyvinyl alcohol constituency, the protective layers 24 and 24' intermediate the polarizing layers and the transparent conductive layers 22 and 22', respectively, may be nitrocellulose or the like. Other materials can, however, be employed. Suitable examples include polyvinylidene chloride, polyvinyl acetal, and the fluorinated polymers such as are disclosed in the aforementioned U.S. Pat. No. 4,066,814. A preferred material is polyvinylidene chloride. A thickness of between 0.10 micron and 20 microns for the protective layers 24 and 24' is satisfactory.

Alignment layers 26 and 26' are applied over the transparent conductive layers 22 and 22' including the protective layers 24 and 24' where the conductive layers 22 and 22' have been removed. The alignment layers 26 and 26' function to orient the typically elongated liquid crystal molecules in contact with and adjacent the alignment layers in a preferred direction.

The alignment layers 26 and 26' may be of any conventional material and deposited by prefrential coating, by vapor deposition, or other processes. The alignment materials can include $S_iO_2$ deposited by preferential vapor deposition or a polyamide or polyimide layer that is subsequently rubbed or buffed to establish an orientation in the desired direction. The alignment layers 26 and 26' may be of polyvinyl alcohol, for example, and approximately 500 angstroms in thickness. Other suitable materials include polyvinylidene chloride, polyvinyl acetal and the fluorinated polymers.

As shown in FIG. 2, the laminate assembly 12', if designated as the rear assembly (opposite the front or viewing assembly), may be provided with a reflector or transreflector layer 28 so that the assembled liquid crystal cell 10 can operate in either a reflecting or transmission mode. A suitable material for the reflective layer is aluminum applied by vapor deposition or a metallic foil laminated between substrate 14' and polarizing layer 18', either sufficient to achieve the desired reflective effect.

The two laminated assemblies 12 and 12' are sealed to one another by a seal 30 which, as shown in FIG. 1, has a rectangular form with length and width dimensions that define the area of the liquid crystal layer. The seal 30 can be fabricated from one of several known materials including a heat-activatable, or pressure-sensitive or radiation-curable adhesive. Suitable adhesives include the polyamide, polyester, polyurethane and polyvinyl adhesives which can be preprinted onto one of the laminated assemblies 12 or 12' in a rectangular or other desired form and then brought into contact and adhered to the other of the laminated assemblies. A preferred seal adhesive is a heat-activatable mixture of polyester and polyvinyl adhesive compounds.

In general, the liquid crystal material confined between the opposing alignment layers 26 and 26' of the laminated substrates 12 and 12' is approximately 5 to 50 microns in thickness with 8–12 microns being typical. The liquid crystal material can be of any conventional composition. Good results can be obtained, for example, using a liquid crystal material of the known twisted nematic type. The liquid crystal material may include adjuncts such as pleochroic dyes or the like. If desired, the liquid crystal display can be sealed and simultaneously filled in accordance with the process described in co-filed U.S. patent application Ser. No. 564,751, filed simultaneously herewith and incorporated herein by reference.

Spacer means (not shown) are incorporated into the area of the cell occupied by the liquid crystal material to assist in maintaining the thickness of the liquid crystal material. Spacer rods or fibers can be admixed with the liquid crystal material for this purpose. If desired, polymeric spacer elements can be printed by gravure or screen printing of, for example, a hot-melt polyamide or UV-curable acrylate onto alignment layer 24. Alternatively, a dispersion of spacer fibers can be coated and dried to provide suitable spacing means. Suitable spacers and their application are described in the aforementioned, incorporated U.S. patent application Ser. No. 564,751.

Thus, it will appreciated that as a result of the present invention, an improved and highly effective liquid crystal display is provided by which the principal objective, among others is completely fulfilled. It will equally be apparent and is contemplated that modifications and/or changes may be made in the illustrated embodiments without departure from the present invention. Accordingly, it is expressly intended that the foregoing description and accompanying drawings are illustrative of preferred embodiments only, not limiting, and that the true sprit and scope of the present invention will be determined by reference to the appended claims.

What is claimed is:

1. A liquid crystal display structure comprising:
   first and second laminate assemblies spaced from one another in a substantially parallel relationship, said first and second laminate assemblies having a layer of liquid crystal material confined therebetween by a seal means;
   each of said laminate assemblies including, in order from said liquid crystal material layer, an alignment layer; a conductive electrode material; a polarizing layer; and a biaxially oriented and birefringent polymeric support for said layers; said conductive electrode material being positioned directly on said polarizing layer;
   one of said laminate assemblies optionally having a reflective layer positioned intermediate said polymeric support and said polarizing layer.

2. The liquid crystal display structure claimed in claim 1, wherein each of said biaxially oriented birefringent polymeric supports comprises polyethylene terephthalate.

3. The liquid crystal display structure claimed in claim 1, wherein each of said polarizing layers has a thickness in the range of about 0.0025 to about 0.076 mm.

4. The liquid crystal display structure claimed in claim 1, wherein said conductive electrode material of at least one of said laminate assemblies defines a pattern of electrodes.

5. The liquid crystal display structure claimed in claim 4, wherein said conductive electrode material of each of said laminate assemblies defines a pattern of spaced parallel stripes, the stripes of each laminate assembly being oriented orthogonal to the other.

6. The liquid crystal display structure claimed in claim 1, wherein each of said polarizing layers is a linear dichroic polarizing layer comprising an iodine-stained and borated stretched layer of polyvinyl alcohol.

7. The liquid crystal display structure claimed in claim 1, wherein each of said polarizing layers is a linear dichroic polarizing layer comprising a stretched polyvinyl alcohol sheet containing polyvinylene light-polarizing species.

8. The liquid crystal display structure claimed in claim 1 wherein on the side of the polymeric support most exterior to the liquid crystal cell of either or both of said laminate assemblies, there is present an anti-reflection coating.

9. The liquid crystal display structure claimed in claim 1 wherein there is present in each of said laminate assemblies:
a layer of adhesive material between said polymeric support and said polarizing layer.

10. The liquid crystal display structure claimed in claim 9, wherein the thickness of said adhesive layer is up to about 1.0 mil.

11. The liquid crystal display structure claimed in claim 1, wherein said seal means is a heat-activatable mixture of polyester and polyvinyl adhesive compounds.

12. The liquid crystal display structure claimed in claim 1, wherein said liquid crystal material layer is between 5 and 50 microns in thickness.

13. The liquid crystal display structure claimed in claim 1, wherein said conductive electrode material of each of said laminate assemblies is defined by spaced parallel stripes, the stripes of each laminate assembly oriented orthogonal to the other.

14. A liquid crystal display structure comprising:
first and second laminate assemblies spaced from one another in a substantially parallel relationship, said first and second laminate assemblies having a layer of liquid crystal material confined therebetween by a seal means;
each of said laminate assemblies including, in order from said liquid crystal material layer, an alignment layer; an electrode structure consisting essentially of a conductive metal sandwiched between layers of titanium dioxide or indium oxide dielectric material; a polarizing layer; and a biaxially oriented and birefringent polymeric support for said layers; said electrode structure being positioned directly on said polarizing layer;
one of said laminate assemblies optionally having a reflective layer positioned intermediate said polymeric support and said polarizing layer.

15. The liquid crystal display structure claimed in claim 14, wherein said conductive electrode material comprises a sandwich of silver between layers of titanium dioxide.

16. The liquid crystal display structure claimed in claim 14, wherein the electrode structure of each of said laminate assemblies is defined by spaced parallel stripes, the stripes of each laminate assembly oriented orthogonal to the other.

17. The liquid crystal display structure claimed in claim 16, wherein said conductive electrode stripes comprise a sandwich arrangement of silver between layers of titanium dioxide.

18. The liquid crystal display structure claimed in claim 14, wherein each of said biaxially oriented birefringent polymeric supports comprises polyethylene terephthalate.

19. The liquid crystal display structure claimed in claim 14, wherein each of said polarizing layers has a thickness in the range of about 0.0025 to about 0.076 mm.

20. The liquid crystal display structure claimed in claim 14, wherein said conductive electrode material of at least one of said laminate assemblies defines a pattern of electrodes.

21. The liquid crystal display structure claimed in claim 14, wherein each of said polarizing layers is a linear dichroic polarizing layer comprising an iodine-stained and borated stretched layer of polyvinyl alcohol.

22. The liquid crystal display structure claimed in claim 14, wherein each of said polarizing layers is a linear dichroic polarizing layer comprising a stretched polyvinyl alcohol sheet containing polyvinylene light-polarizing species.

23. The liquid crystal display structure claimed in claim 14, wherein on the side of the polymeric support most exterior to the liquid crystal cell of either or both of said laminate assemblies, there is present an anti-reflection coating.

24. The liquid crystal display structure claimed in claim 14, wherein there is present in each of said laminate assemblies:
a layer of adhesive material between said polymeric support and said polarizing layer.

25. The liquid crystal display structure claimed in claim 24, wherein the thickness of said adhesive layer is up to about 1.0 mil.

26. The liquid crystal display structure claimed in claim 14, wherein said seal means is a heat-activatable mixture of polyester and polyvinyl adhesive compounds.

27. The liquid crystal display structure claimed in claim 14, wherein said liquid crystal material layer is between 5 and 50 microns in thickness.

28. A liquid crystal display structure comprising:
first and second laminate assemblies spaced from one another in a substantially parallel relationship, said first and second laminate assemblies having a layer of liquid crystal material confined therebetween by a seal means;
each of said laminate assemblies including, in order from said liquid crystal material layer, an alignment layer; a conductive electrode material; a protective barrier layer; a linear dichroic polarizing layer; and a biaxially oriented and birefringent polymeric support; said protective layer having a thickness in the range of 0.10 micron and 20 microns and being effective to protect said liquid crystal material against contamination from said linear dichroic polarizing layer and to protect said conductive electrode material from corrosive or degradative influences thereon by said linear dichroic polarizing layer; said conductive electrode material beng positioned directly on said protective barrier layer; one of said laminate assemblies optionally having a reflective layer positioned intermediate said polymeric support and said polarizing layer.

29. The liquid crystal display structure claimed in claim 28, wherein each of said polymeric supports comprises biaxially oriented and birefringent polyethylene terephthalate.

30. The liquid crystal display structure claimed in claim 28, wherein each of said linear dichroic polarizing layers has a thickness in the range of about 0.0025 to about 0.076 mm.

31. The liquid crystal display structure claimed in claim 28, wherein each of said polarizing layers comprises an iodine-stained and borated stretched layer of polyvinyl alcohol.

32. The liquid crystal display structure claimed in claim 28, wherein each of said polarizing layers comprises a stretched polyvinyl alcohol sheet containing polyvinylene light-polarizing species.

33. The liquid crystal display structure claimed in claim 28, wherein said protective barrier layer has a thickness in the range of 0.10 micron to 10 microns.

34. The liquid crystal display structure claimed in claim 28, wherein each of said protective barrier layers comprises polyvinylidene chloride.

35. The liquid crystal display structure claimed in claim 28 wherein, on the side of the polymeric support most exterior to the liquid crystal cell of either or both of said laminate assemblies, there is present an antireflection coating.

36. The liquid crystal display structure claimed in claim 28 wherein there is present in each of said laminate assemblies:
   a layer of adhesive material between said polymeric support and said polarizing layer.

37. The liquid crystal display structure claimed in claim 36 wherein the thickness of said adhesive layer is up to about 1.0 mil.

38. A liquid crystal display structure comprising:
   first and second laminate assemblies spaced from one another in a substantially parallel relationship, said first and second laminate assemblies having a layer of liquid crystal material confined therebetween by a seal means;
   each of said laminate assemblies including, in order from said liquid crystal material layer, an alignment layer; an electrode structure consisting essentially of a conductive metal sandwiched between layers of titanium dioxide or indium oxide dielectric material; a protective barrier layer; a linear dichroic polarizing layer; and a biaxially oriented and birefringent polymeric support; said protective layer having a thickness in the range of 0.10 micron and 20 microns and being effective to protect said liquid crystal material against contamination from said linear dichroic polarizing layer and to protect said conductive electrode material from corrosive or degradative influences thereon by said linear dichroic polarizing layer; said electrode structure being positioned directly on said protective barrier layer;
   one of said laminate assemblies optionally having a reflective layer positioned intermediate said polymeric support and said polarizing layer.

39. The liquid crystal display structure claimed in claim 38, wherein each of said polymeric supports comprises biaxially oriented and birefringent polyethylene terephthalate.

40. The liquid crystal display structure claimed in claim 38, wherein each of said linear dichroic polarizing layers has a thickness in the range of about 0.0025 to about 0.076 mm.

41. The liquid crystal display structure claimed in claim 38, wherein each of said polarizing layers comprises an iodine-stained and borated stretched layer of polyvinyl alcohol.

42. The liquid crystal display structure claimed in claim 38, wherein each of said polarizing layers comprises a stretched polyvinyl alcohol sheet containing polyvinylene light-polarizing species.

43. The liquid crystal display structure claimed in claim 38, wherein said protective barrier layer has a thickness in the range of 0.10 micron to 10 microns.

44. The liquid crystal display structure claimed in claim 38, wherein each of said protective barrier layers comprises polyvinylidene chloride.

45. The liquid crystal display structure claimed in claim 38, wherein on the side of the polymeric support most exterior to the liquid crystal cell of either or both of said laminate assemblies, there is present an antireflection coating.

46. The liquid crystal display structure claimed in claim 38, wherein there is present in each of said laminate assemblies:
   a layer of adhesive material between said polymeric support and said polarizing layer.

47. The liquid crystal display structure claimed in claim 46, wherein the thickness of said adhesive layer is up to about 1.0 mil.

* * * * *